United States Patent
Bermingham et al.

(10) Patent No.: US 7,552,282 B1
(45) Date of Patent: Jun. 23, 2009

(54) METHOD, COMPUTER READABLE MEDIUM, AND DATA STORAGE SYSTEM FOR SELECTIVE DATA REPLICATION OF CACHED DATA

(75) Inventors: Michael Bermingham, Framingham, MA (US); Kendell A. Chilton, Southborough, MA (US); Robert DeCrescenzo, Franklin, MA (US); Mark J. Halstead, Watertown, MA (US); Haim Kopylovitz, Newton, MA (US); Steven T. McClure, Northborough, MA (US); James M. McGillis, Franklin, MA (US); Ofer E. Michael, Newton, MA (US); Brett D. Niver, Grafton, MA (US); John K. Walton, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 124 days.

(21) Appl. No.: 10/911,365

(22) Filed: Aug. 4, 2004

(51) Int. Cl.
*G06F 12/00* (2006.01)
*G06F 13/00* (2006.01)
*G06F 13/28* (2006.01)

(52) U.S. Cl. ............... 711/119; 711/118; 711/120
(58) Field of Classification Search ............ 711/120
See application file for complete search history.

(56) References Cited

U.S. PATENT DOCUMENTS

| | | | |
|---|---|---|---|
| 5,206,939 A | 4/1993 | Yanai et al. | |
| 5,381,539 A | 1/1995 | Yanai et al. | |
| 5,592,432 A | 1/1997 | Vishlitzky et al. | |
| 5,778,394 A | 7/1998 | Galtzur et al. | |
| 5,802,561 A * | 9/1998 | Fava et al. | 711/120 |
| 5,845,147 A | 12/1998 | Vishlitzky et al. | |
| 5,857,208 A | 1/1999 | Ofek | |
| 5,893,919 A * | 4/1999 | Sarkozy et al. | 711/114 |
| 5,895,485 A * | 4/1999 | Loechel et al. | 711/119 |
| 5,974,506 A * | 10/1999 | Sicola et al. | 711/120 |
| 5,991,852 A * | 11/1999 | Bagley | 711/112 |
| 6,049,855 A * | 4/2000 | Jeddeloh | 711/157 |
| 6,526,418 B1 * | 2/2003 | Midgley et al. | 707/204 |
| 6,574,709 B1 * | 6/2003 | Skazinski et al. | 711/119 |
| 6,604,171 B1 * | 8/2003 | Sade | 711/113 |
| 6,807,611 B2 * | 10/2004 | Hauck et al. | 711/162 |
| 6,883,072 B2 * | 4/2005 | Walton et al. | 711/155 |
| 2005/0131965 A1 * | 6/2005 | Lam et al. | 707/204 |
| 2005/0198411 A1 * | 9/2005 | Bakke et al. | 710/22 |
| 2006/0004973 A1 * | 1/2006 | Sardella et al. | 711/162 |

OTHER PUBLICATIONS

U.S. Appl. No. 10/463,247, filed Jun. 17, 2003, Ezra.
U.S. Appl. No. 10/078,923, filed Feb. 19, 2002, Chalmer, et al.

\* cited by examiner

*Primary Examiner*—Hyung S Sough
*Assistant Examiner*—Gary W Cygiel
(74) *Attorney, Agent, or Firm*—Muirhead and Saturnelli, LLC

(57) ABSTRACT

Described are techniques for selective data replication. Cached data is replicated if it is characterized as critical. Critical data may include data associated with a write I/O operation. Cache locations are selected for replicated data so that a first location is mapped to a first memory board and a second location is mapped to a second memory board. Data for a read operation is not replicated in cache. Other non-cache data that is critical and thus replicated includes metadata. Cache locations for data of read and write I/O operations are selected dynamically at the time the I/O operation is made from the same pool of cache locations.

19 Claims, 17 Drawing Sheets

| TYPE 460 | LOGICAL ADDRESS 470 | PHYSICAL1 480 | PHYSICAL2 490 |
|---|---|---|---|
| Protected (Metadata) | 0-4GB | Mem1 Offset 0 | Mem2 Offset 0 |
| Cache Space 1 | 8GB-12GB | Mem1 Offset 4GB | |
| Cache Space 2 | 16GB-20GB | Mem2 Offset 4GB | |

METHOD, COMPUTER READABLE MEDIUM, AND DATA STORAGE SYSTEM FOR SELECTIVE DATA REPLICATION OF CACHED DATA

BACKGROUND

1. Technical Field

This application generally relates to a data storage system, and more particularly to techniques used for data replication.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected together and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. Performance of a storage system may be improved by using a cache. In the case of a disk drive system, the cache may be implemented using a block of semiconductor memory that has a relatively lower data access time than the disk drive. Data that is accessed is advantageously moved from the disk drives or other device to the cache so that the second and subsequent accesses to the data may be made to the cache rather than to the disk drives. Data that has not been accessed recently may be removed from the cache to make room for new data. Often such cache accesses are transparent to the host system requesting the data.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

One problem that may be encountered in connection with use of a cache memory is that the underlying hardware for all or a portion of the cache may experience failures. Existing systems may perform a write operation and buffer the data in cache prior to actually writing the data out to disk for performance reasons. A system may only send an acknowledgement that the write operation is complete after the data is actually written out to the device. However, this may cause performance problems. Alternatively, a write operation may be acknowledged as complete after the data is stored in the cache rather than on the actual device. However, in the event that the cache fails prior to writing the data to disk, the data may be lost. As a solution, the cache memory may be fully replicated such that each write to cache results in 2 copies of the same data being stored. This has a drawback in that twice the amount of cache memory is required. Another solution may divide caching memory into a read cache and a write cache in which the write cache includes replication. This also has drawbacks in that there are hard predefined limits on the different read and write caches and also requires a fixed partitioning of the cache space.

It may be desirable to utilize a flexible system and technique which provides for replication of cache memory without having a single point of failure without requiring the predefined and separate read and write caches and fixed partitioning. It may also be desirable to have such a system and technique operate to provide for replication of cache memory for a specified portion of data and/or associated operations and be configurable in the event of an equipment failure.

SUMMARY OF THE INVENTION

In accordance with one aspect of the invention is a method for replicating cached data comprising: determining whether to replicate a portion of cache data in accordance with predetermined criteria, said predetermined criteria including data that is associated with a write operation; if said portion is to be replicated, selecting a first cache location on a first memory board and selecting a second cache location on a second memory board different from said first memory board; and if said portion is not replicated, selecting a third cache location wherein said cache locations are selected from a same set of cache locations. The method may also include: receiving a read operation request at a data storage system; determining if data of the read operation is not associated with a cache location; and if the data of the read operation is not associated with a cache location: obtaining the data of the read operation from a device; selecting a fourth cache location from said same set of cache locations; and storing the data of the read operation at the fourth cache location. Data replication may not be performed in connection with data cached for a read operation. The method may also include: if the data of the read operation is associated with a cache location, determining if the data of the read operation is replicated in another cache location; and if the data of the read operation is replicated, selecting one of the cache locations including the data of the read operation for obtaining the data to be returned to a requestor. The method may include: receiving a write operation request at a data storage system; determining if a target of the write operation is associated with a cache location; if the target of the write operation is associated with a cache location, determining whether the data of the cache location for the write operation is replicated; if the data of the cache location for the write operation is not replicated, determining another cache location and updating both cache locations to include data of the write operation request; if the data of the write operation is replicated, updating both cache locations to include data of the write operation request; and if the data of the write operation is not associated with a cache location, determining two cache locations for storing two copies of the data of the write operation. The predetermined criteria may include a setting indicating whether replication for caching has been enabled for I/O operations associated with a particular device. The predetermined criteria may include device configuration information. Selection of a cache location may be dynamically determined in response to receiving an I/O operation request at a data storage system in accordance with at least one condition of a data storage system when said I/O operation is processed.

In accordance with another aspect of the invention is a computer program product for replicating cached data comprising code that: determines whether to replicate a portion of cache data in accordance with predetermined criteria, said predetermined criteria including data that is associated with a write operation; if said portion is to be replicated, selects a first cache location on a first memory board and selecting a second cache location on a second memory board different from said first memory board; and if said portion is not replicated, selects a third cache location wherein said cache locations are selected from a same set of cache locations. The computer program product may also include code that: receives a read operation request at a data storage system; determines if data of the read operation is not associated with a cache location; and if the data of the read operation is not associated with a cache location: obtains the data of the read operation from a device; selects a fourth cache location from said same set of cache locations; and stores the data of the read operation at the fourth cache location. Data replication may not be performed in connection with data cached for a read operation. The computer program product may also include code that: if the data of the read operation is associated with a cache location, determines if the data of the read operation is replicated in another cache location; and if the data of the read operation is replicated, selects one of the cache locations including the data of the read operation for obtaining the data to be returned to a requestor. The computer program product may also include code that: receives a write operation request at a data storage system; determines if a target of the write operation is associated with a cache location; if the target of the write operation is associated with a cache location, determines whether the data of the cache location for the write operation is replicated; if the data of the cache location for the write operation is not replicated, determines another cache location and updating both cache locations to include data of the write operation request; if the data of the write operation is replicated, updates both cache locations to include data of the write operation request; and if the data of the write operation is not associated with a cache location, determines two cache locations for storing two copies of the data of the write operation. The predetermined criteria may include a setting indicating whether replication for caching has been enabled for I/O operations associated with a particular device. The predetermined criteria may include device configuration information. Selection of a cache location may be dynamically determined in response to receiving an I/O operation request at a data storage system in accordance with at least one condition of a data storage system when said I/O operation is processed.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9 and 10 are representations of logical address space mappings using the techniques described herein;

DETAILED DESCRIPTION OF EMBODIMENT(S)

Figure 1:
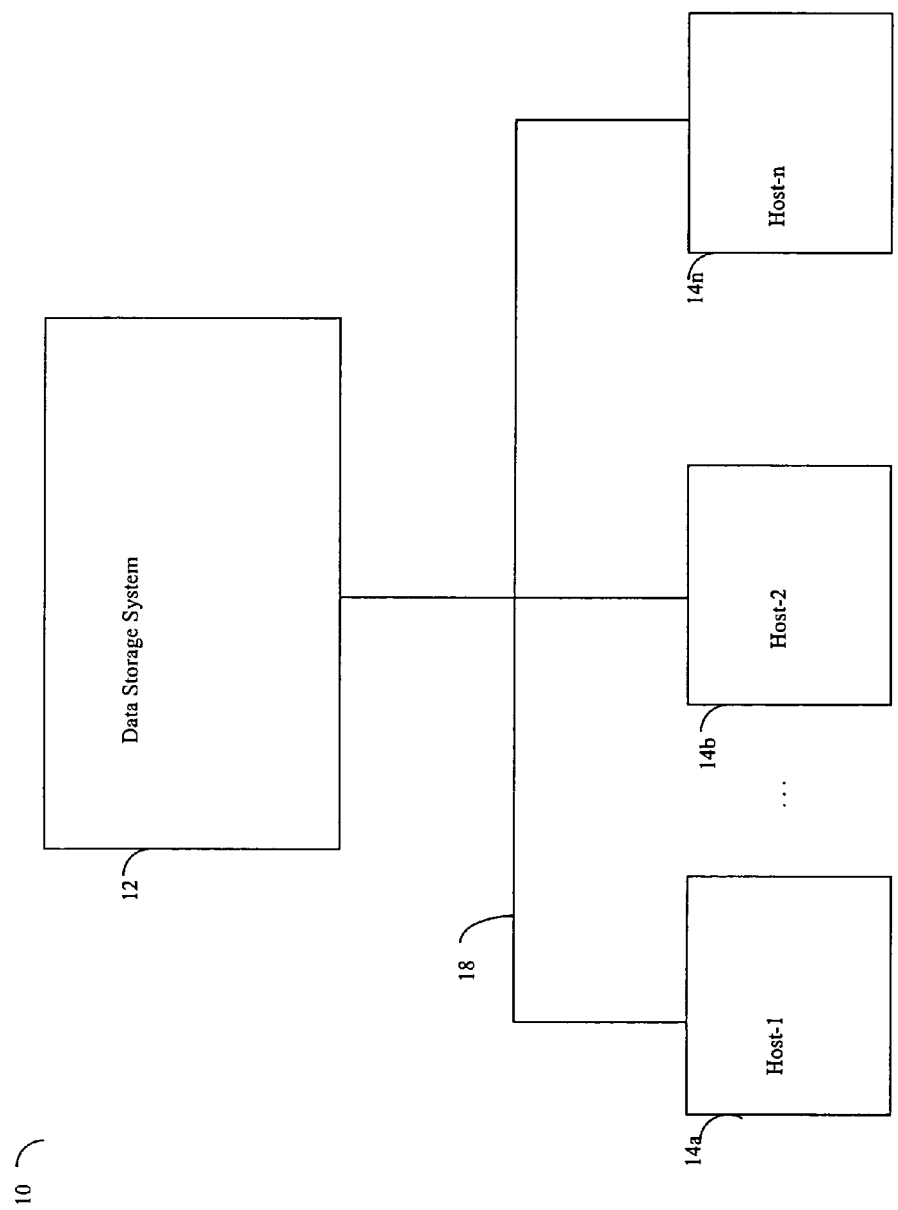
FIG. 1 is an example of an embodiment of a computer system according to the present invention.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support incoming traffic in accordance with each particular embodiment and application.

It should be noted that the particulars of the hardware and software included in each of the components that may be included in the data storage system 12 are described herein in more detail, and may vary with each particular embodiment.

Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or GIGE (Gigabit Ethernet), and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
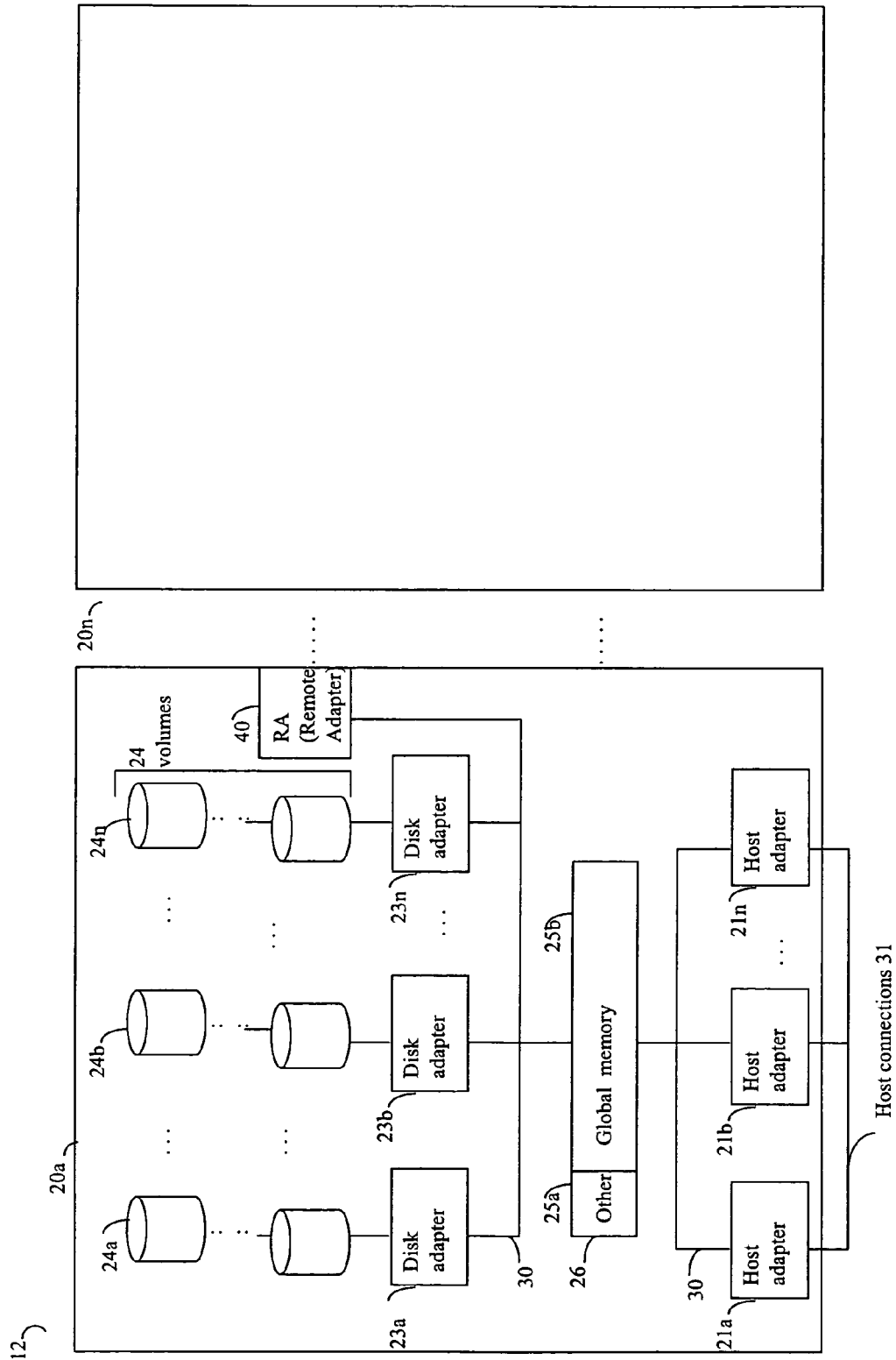
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk processors or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA may perform I/O operations on a volume or device. In the following description, data may be accessed by LV in which a single DA manages data requests in connection with I/O operations of multiple LVs that may reside on a disk.

Figure 2B:
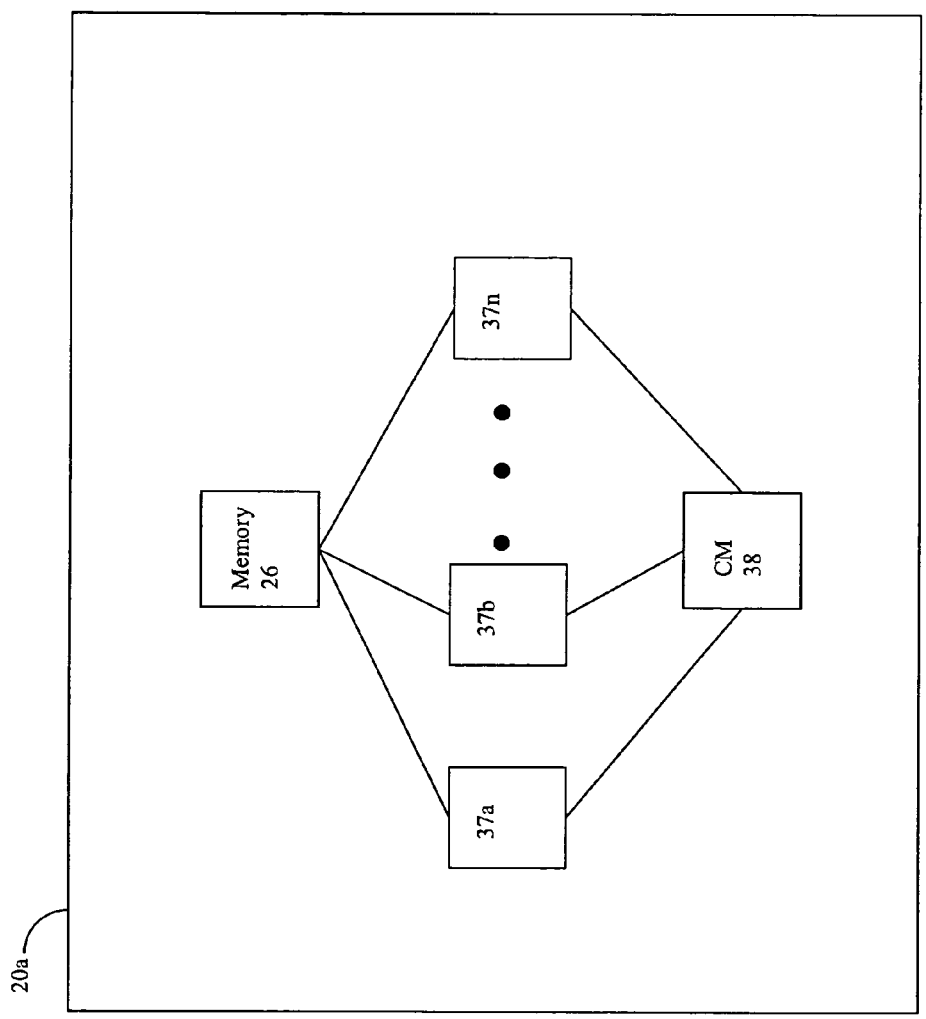
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
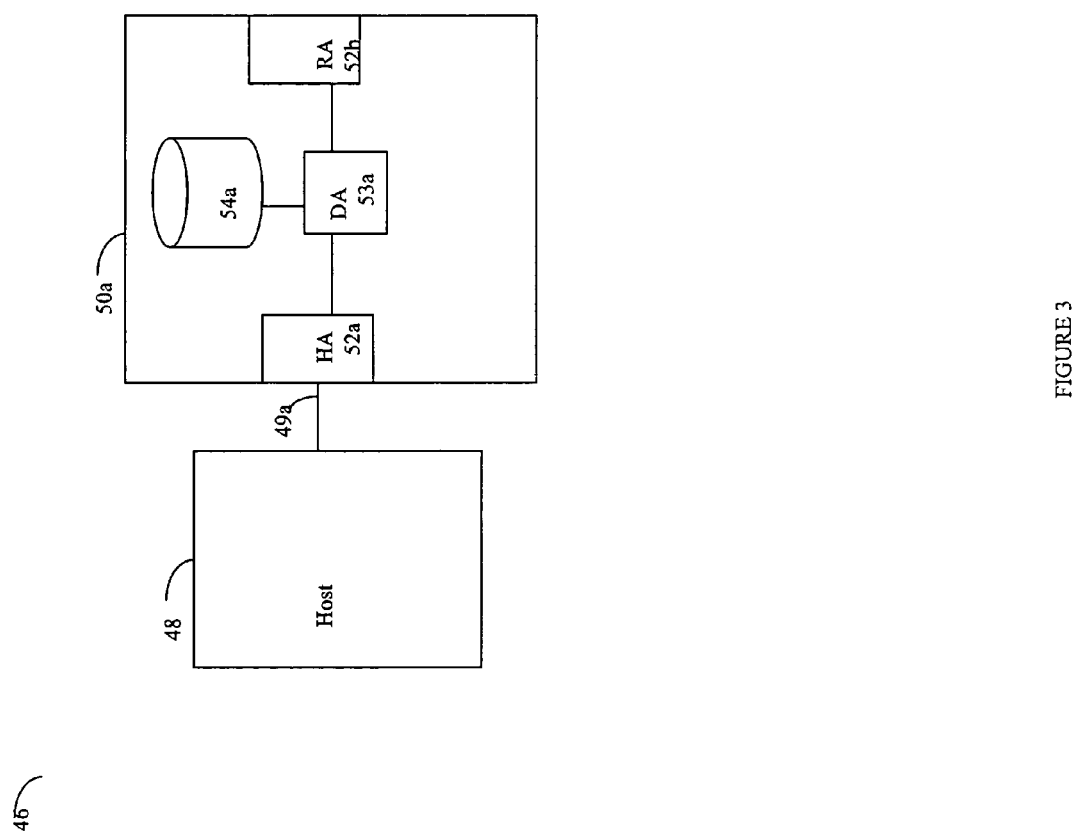
FIG. 3 is a simplified illustration of an example of an embodiment of the computer system of FIGS. 1 and 2.

Referring now to FIG. 3, shown is an example of an embodiment of a computer system 46 illustrating the relationship between a host 48 and a first data storage system 50a. It should be noted that the embodiment illustrated in FIG. 3 is a simplified view of components of a computer system, for example, including only some detail in data storage systems 50a for the sake of simplicity. The host 48 may issue a command to data storage system 50a over connection 49a using the HA 52a. An application executing on the host 48 may issue an I/O operation, such as a read or write request in connection with data on device 54a of data storage system 50a.

Figure 4:
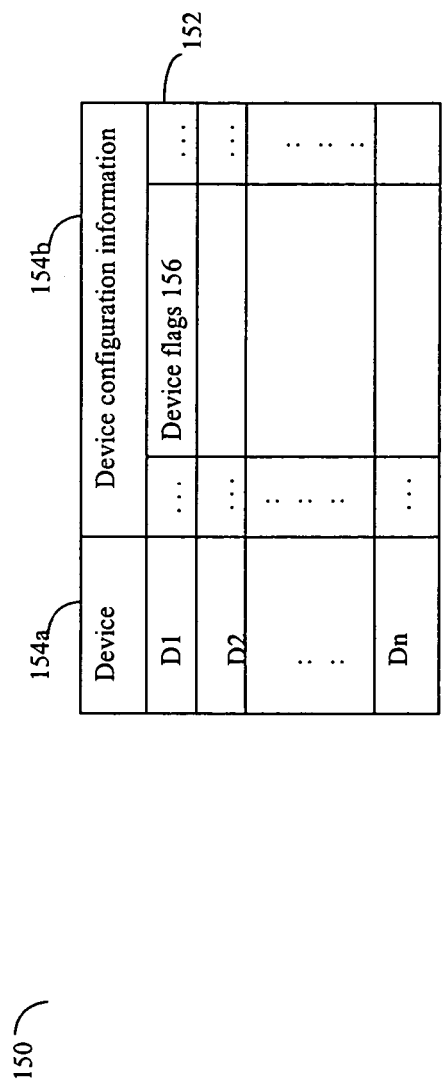
FIG. 4 is an example of an embodiment of a device configuration table.

Referring now to FIG. 4, shown is an example of a device configuration table 150 that includes device configuration information in column 154b corresponding to a device specified in the first column, 154a. A particular row of the table 150, such as 152, includes device configuration information associated with a particular device such as D1. Device flags 156 may be included as a portion of the device configuration information 154b. Device flags 156 may include one or more bit flags specifying device specific information. In one embodiment, a device in column 154a may be associated with a caching device flag included in the device flags field 156. The caching device flag may be set to indicate whether the caching replication techniques described herein should be enabled for an associated device. The particular caching replication techniques described herein provide for selective replication of data that may be characterized as critical in the event of a hardware failure. Consequently, certain portions of data may be replicated using techniques described herein to provide for protection of critical data in the event of hardware failure. The selective replication is described in more detail in following paragraphs.

The device configuration information included in table 150 may be stored in a portion of global memory that includes device configuration data. The device configuration information 154b including values for device flags 156 may be specified as part of a data configuration file. The device flag may be initially set and/or subsequently modified, for example, using system calls to modify the data configuration file. An embodiment may provide for dynamic and/or manual modification of the data configuration information 154b, such as the device flag associated with the caching device flag. Other embodiments may utilize other techniques in connection with specifying whether the replication and protection techniques for caching as described herein are enabled/disabled when processing I/O operations.

It should also be noted that an embodiment may store the configuration information in global memory as well as in other locations that may vary in accordance with each embodiment. In other words, a global copy may be stored in global memory and the global copy may be stored and utilized, for example, by each of the directors or processors in an embodiment of the data storage system as described, for example, in connection with FIG. 2A.

It should be noted that an embodiment may have a device record corresponding to each particular device within the system. The device record may include both dynamic and static device specific information, such as device characteristics in addition to the caching device flag. It should also be noted that a value may be specified for the caching device flag in a configuration file. The configuration file may be read at one or more times in an embodiment, for example, in connection with a device being powered-on or brought on-line, and the like. The configuration file data may be used to initialize portions of device records, for example, in connection with a device or the data storage system being brought on line.

A particular embodiment may include the configuration file in the HA or other adapter of the system. For example, an embodiment may use a SCSI adapter (SA) or fibre channel adapter (FA) rather than an HA in communications with a host. A copy of a configuration file may be stored within the HA, SA, or FA as may be included in an embodiment, for example, to minimize traffic within the data storage system 12. However, an embodiment may also store and read the configuration file from elsewhere, such as global memory within the data storage system 12. The particular location(s) of the configuration file may vary in accordance with each embodiment.

As described above, an embodiment of a data storage system may include one or more caches. What will now be described are details of one implementation and organization of such a cache, for example, as described in issued U.S. Pat. No. 5,381,539, Yanai et al., entitled "System and Method for Dynamically Controlling Cache Management", assigned to EMC Corporation of Hopkinton, Mass., which is incorporated herein by reference. It should be noted that although one particular representation and arrangement of a cache structure is described herein for purposes of illustration, an embodiment may use any cache arrangement and management with the techniques described herein. For example, another implementation and organization of a cache may be a tag-based cache as described, for example, in U.S. patent application Ser. No. 10/463,247, filed Jun. 17, 2003, entitled "QOS Feature Knobs", which is incorporated by reference herein. The particular examples selected for purposes of illustration should not be construed as a limitation of the techniques described herein.

Figure 5:
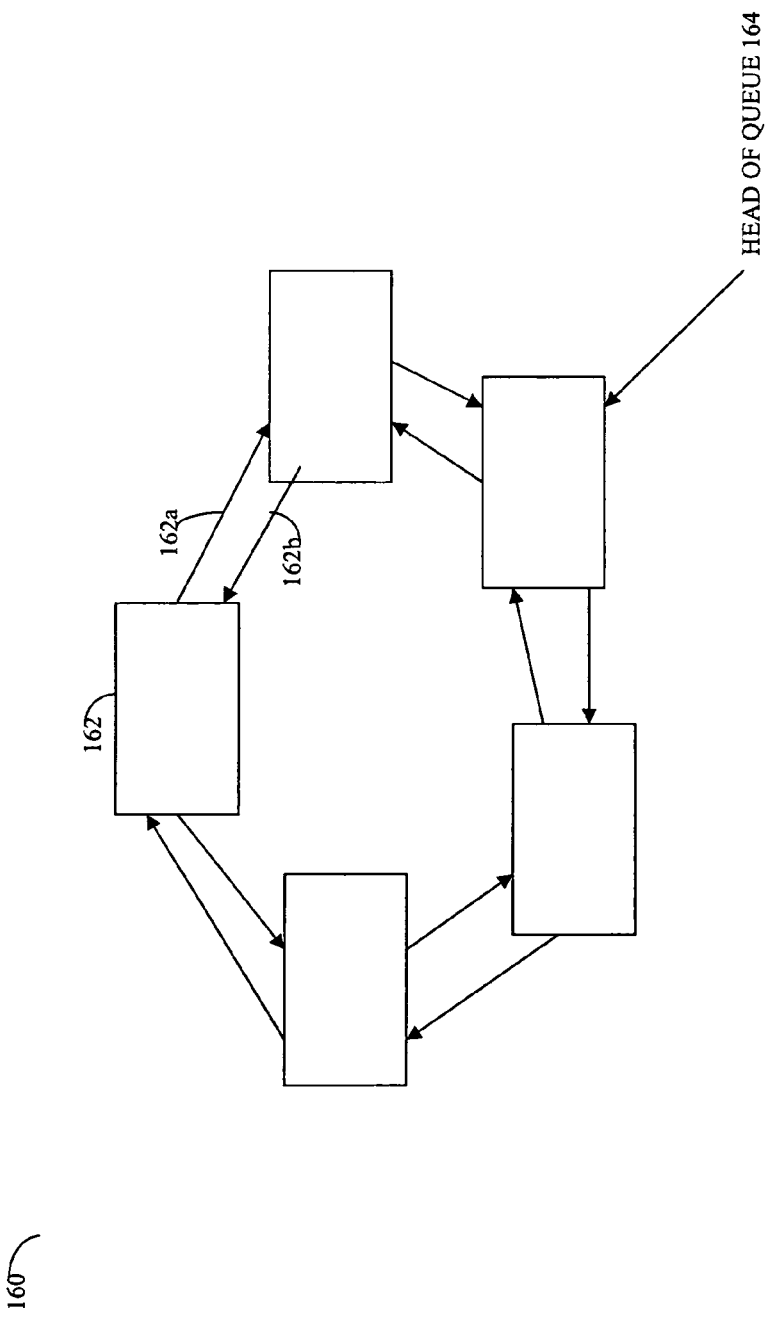
FIG. 5 is an example of an embodiment of a cache.

Referring now to FIG. 5, shown is an example of an embodiment 160 of a cache arrangement that may be used, for example, when performing data operations in a system as described herein. Shown in the representation 160 is a circular structure in which each of the elements, such as 162, corresponds to a cache slot. Each cache slot may correspond to a portion of memory, such as one or more memory blocks. Each memory block may correspond to, for example, a track on one of the drives shown in connection with FIG. 2A. In this representation, each of the slots are connected to other slots by forward and backward pointers, such as 162a and 162b, in a doubly linked list arrangement. Additionally, the head or beginning of the replacement queue is designated by a head pointer 164.

It should be noted that as described herein, an embodiment may include a cache which is in the form of the replacement queue using doubly linked list or other data structures known to those of ordinary skill in the art. The arrangement of FIG. 5 described herein should not be construed as a limitation to the techniques described herein. Additionally, it should be noted that an embodiment may use a least-recently-used or other technique in determining which slots remain in the cache and which ones are removed.

Figure 6:
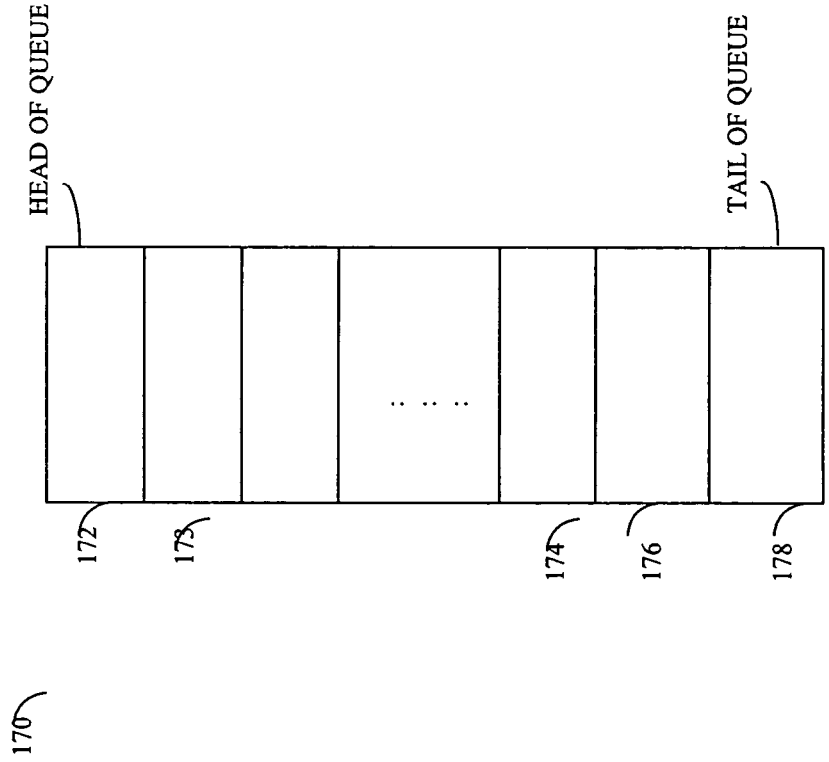
FIG. 6 is an alternative representation of an embodiment of a cache of FIG. 5.

Referring now to FIG. 6, shown is an equivalent representation 170 of the previously described structure 160 in connection with FIG. 5. The representation shown in FIG. 6 is a logical equivalent of the representation shown in FIG. 5. The representation 170 of FIG. 6 logically corresponds to that in FIG. 5 such that, for example, element 172 corresponds to the beginning cache slot as noted by the head of the replacement queue pointer 164 in connection with the previously described figure. Similarly, the last element of the structure is denoted by slot 178 which in this example is labeled also as the tail of the queue structure. Elements or slots may be inserted into the list at the head of the replacement queue and exit or leave the cache at the tail of the replacement queue. For example, when an element is deposited into the cache, it may be placed at the head of the replacement queue in slot location denoted by 172 in connection with a read operation. Additional elements may be progressively added to the head portion or other location within the replacement queue 172. As elements are added to the queue, subsequent elements progress toward the tail of the list. When another slot is added to the replacement queue at position 172, the slot currently at position 172 moves to that slot designated as position 173 and the newly added element falls into the position of element 172.

An element may be placed in the queue, for example, when an element is referenced in connection with an I/O operation such as a cache miss for a read operation, or in connection with processing pending write operations, for example. Once in the queue, an element progresses through the queue from the head 172 towards the tail 178 of the queue.

The foregoing queue arrangement in connection with a cache or shared memory may have drawbacks depending on the particular implementation. For example, exclusive access to the queue may be implemented using a locking mechanism that only allows a single process to access the entire queue. Additionally, pointer manipulation in connection with performing management operations may also be expensive.

Figure 7:
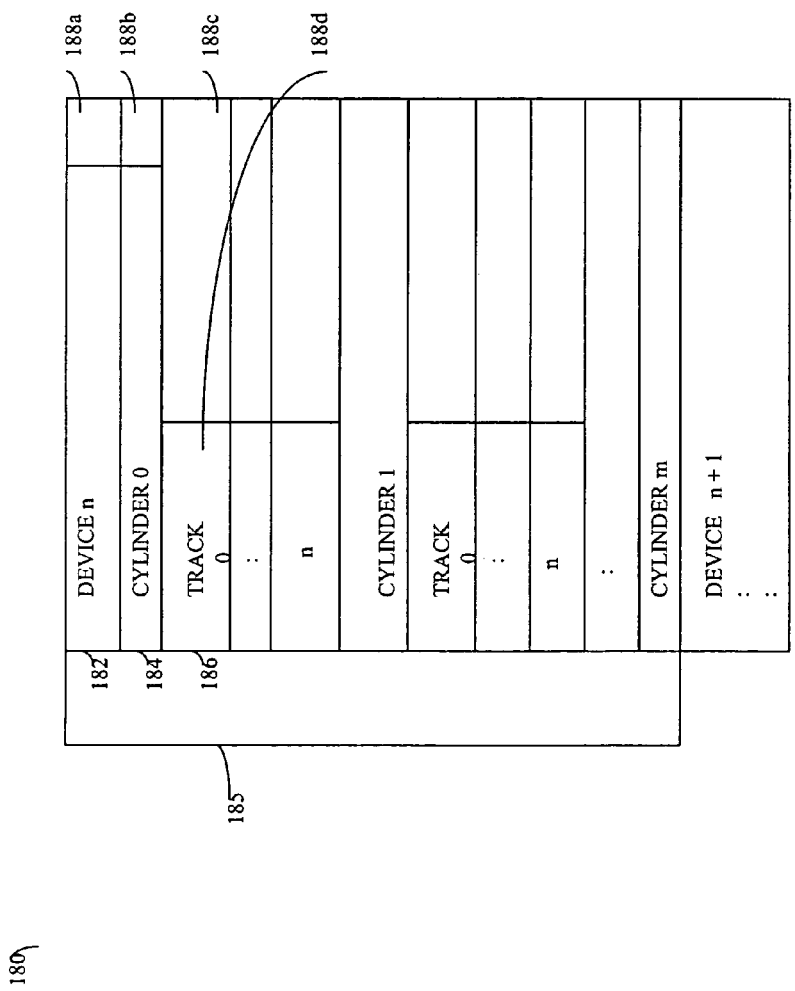
FIG. 7 is an example of an embodiment of a cache index directory.

To indicate the data that is stored in the cache, a cache index or directory may be used. An embodiment may implement this using any one of a variety of different arrangements and structures. FIG. 7 shows one particular representation illustrating a device-by-device cache mapping.

Referring now to FIG. 7, shown is an example of a representation of a cache index/directory table. The table 180 may be organized on a device-by-device level to indicate for a particular portion of a device, is the portion in cache, and if so, where in cache is it located. An embodiment that includes devices, for example, such as disks, may include a further refinement or granularity in the table 180 corresponding to a location in cache.

The table 180 may include a hierarchical structure relative to the structure of a disk, such as cylinders and tracks on a disk. In one embodiment, a track may be a 32K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184 and for each track within each cylinder 186. For a device, a bit indicator 188a may indicate whether data associated with the device is stored in cache. The bit indicator 188b may further indicate for a particular cylinder within a device, is any data stored in the cache. Associated with each track may be a corresponding portion 188c indicating whether data associated with a particular track is in the cache and an associated address of one or more locations in the cache where the data for a particular track may be found, for example, in connection with performing a read operation or a pending write operation. The portion 188d may include other information associated with a particular track, such as a valid cache address if data is stored in the cache for the particular track.

As will be described in following paragraphs, a track of data may be stored in a single cache slot or may be replicated in two cache slots. The corresponding entry in table 180 may indicate whether data for a track is stored in cache, whether the data is stored in one or two cache slots, and a cache address for each cache slot.

Figure 8:
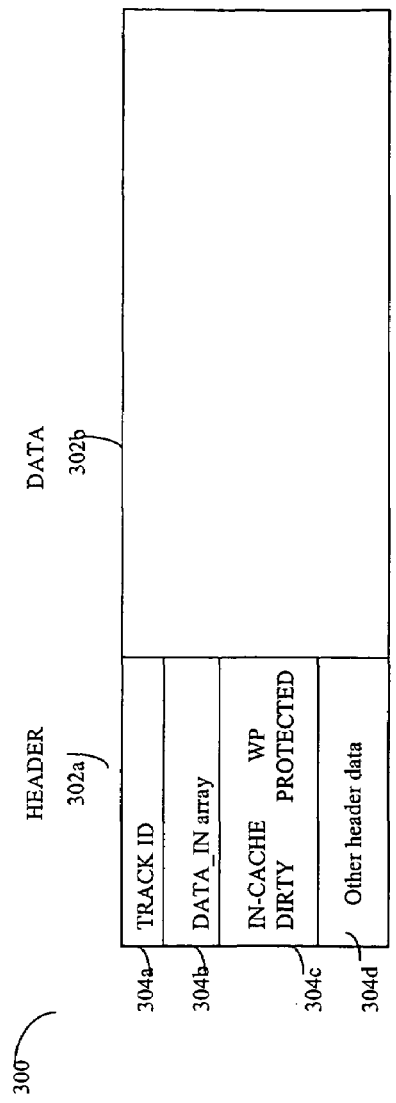
FIG. 8 is an example of a representation of a cache slot.

Referring now to FIG. 8, shown is an example of an embodiment of a cache slot. In this example representation 300, a cache slot may include a header portion 302a and a data portion 302b. When a cache slot is assigned to a track, the track's identifying data is stored in the slot's header. The header portion 302a may include one or more other sections including a track ID section 304a, a DATA_IN array 304b, a FLAGS section 304c, and optionally other header data in section 304d. The TRACK_ID section 304a may include an identifier of the particular track which is associated with this cache slot. The DATA_IN ARRAY 304b may be implemented as, for example, a bit array orbit vector in which each bit position corresponds to a particular block of data of the associated track. A value of one (1) in a particular bit position in the DATA_IN array indicates that a particular block of the associated track is included in the data portion 302b at the slot 300. A zero (0) indicates otherwise.

The FLAGS section 304c may include one or more bit flags or other types of flags to indicate a certain status about the data included in 302b and the like. For example, in one embodiment, the FLAGS section 304c includes a flag called IN-CACHE which indicates whether a particular track has an associated cache slot. IN-CACHE with a value of one (1) in this embodiment indicates that this particular slot is assigned to a track as indicated in the TRACK_ID section 304a. The WP or write pending flag indicates whether data included in this particular cache slot is associated with a write pending operation. The PROTECTED flag with a value of one (1) indicates that this slot includes data that has been determined as critical and is protected using the caching replication techniques described herein. If the PROTECTED flag is one (1), the contents of this cache slot are replicated in another cache slot associated with a second different memory board using the techniques described elsewhere herein. The DIRTY bit may be set to one (1) to indicate whether the cached copy of data differs from that which is actually stored on the device. In one embodiment described herein, the DIRTY bit may be used, for example, in connection with a write-back caching policy. When a write is made to location that is currently cached, the new data is only written to the cache, not actually written to the device. Later, if another memory location needs to use the cache line where this data is stored, the cached data is saved ("written back") to the device and then the line can be used by the new address. As a result, at any given time, there can be a mismatch between many of the lines in the cache and the corresponding device locations to which they correspond. When this happens, the data on the device may be characterized as stale. Whenever a write is cached, the DIRTY bit may be set to one (1) indicating that the cached contents differs from that which is stored on a device. In the event that the cache management decides to re-use a cache line or slot which is DIRTY, the cached data first is written out to the device.

It should be noted that other embodiments may include other organizations in connection with a cache slot. Additionally, an embodiment may also include other information in the particular header, for example, such as additional flags other than as described herein.

As described herein, a track is a portion of the particular device which in this example has a size of 32K bytes of data and is the same amount that may be included in a single cache slot. It should be noted that other embodiments may have different size cache slots associated with different logical entities on a particular device of different sizes.

The flag in the section 304c IN-CACHE may be set when a slot is assigned to a track. When IN-CACHE is one (1), the slot may or may not hold a portion of the track's actual data in the section 302b. The fact that a particular slot is assigned or associated with a track is indicated by the value of the flag IN-CACHE being equal to one. In other words, the flag IN-CACHE having a value of one (1) does not indicate a status of whether or not there is data included in the actual data portion 302b. The section 304b DATA_IN ARRAY may be implemented as an array or a bit vector that includes a bit associated with each block of data of a particular track or slot. A value of one (1) in a particular entry in the bit array indicates that the associated block is actually stored in the data portion 302b. A zero (0) in the DATA_IN ARRAY bit position indicates otherwise. The WP flag in the section 304c is set to one (1) when a block is received from the host and is to be written to the cache slot. When a disk adapter or a DA actually writes data out to a device, the WP flag, for example in this Section 304c, may be set to zero (0) to indicate that the data is no longer write pending.

It should be noted that the foregoing notations described in connection with a cache slot are used in the following description for performing data operations in one embodiment. In connection with a read operation, the DA reads the data requested from the device and stores it in a cache slot. The DA, for example, may obtain a cache slot if there is not already one allocated and associated with a particular track ID as indicated in the track ID table 180. The data is read from the device by the DA and stored in the cache slot 302b with the appropriate bits set 304b, 304c to indicate the state of the data included therein. Additionally, the track ID table 180 may also be updated in accordance with the particular data operation.

In one embodiment, data that is to be written to a device is first stored in a cache slot and marked as a write pending. The data is then actually written out to the device at a later point in time. Use of a cache as a temporary holding place for received data to be written and other techniques may be employed in an embodiment to process the incoming write requests since the actual writing of data to a device may be characterized as comparatively slower when compared to the rate at which data is transferred to the target location.

It should be noted that a slot may be indicated as free or not associated with a track when the IN-CACHE flag in section 304c has a value of zero.

It should be noted that in an embodiment, various other tasks may also be performed independently and ongoing in addition to those described herein for processing to various operations. For example, in an embodiment having a write pending or WP status associated with a cache slot, the DA may constantly be scanning for WP cache slots associated with a device under its direction. When a particular DA locates a WP cache slot or a device controlled by the particular DA, the data may actually be written to the media or physical device. Generally, this process may be referred to as destaging where the DA destages the data from the memory or the cache slot indicated as WP to the actual device. Upon completion of the destaging operation, the DA may also accordingly set the WP indicator to be zero indicating that there is no longer a write pending operation since the data has been written out to the actual device. In one embodiment utilizing the cache, once a slot that is marked as a WP has been written out to the actual device, the slot may be marked as available for use or otherwise returned to the pool of available slots in the cache.

It should also be noted that in connection with accessing any slot in the cache, an embodiment may implement locking techniques as described herein, for example, in accordance with the particular policy included in an embodiment. For example, in one embodiment as described herein there may be a policy of exclusive access for accessing the cache. In this instance, for example, whenever the cache is accessed to obtain a slot or write to a slot, the particular director, such as the host adapter, may lock the slot using hardware and/or software locking mechanisms as may be included in an embodiment. Similarly, when a particular director or processor has completed operations utilizing the cache, the locks are released such that the cache resource may be utilized by other processors included in the system.

What will now be described are techniques that may be used in connection with performing dynamic mapping and protection of cache slots on a per cache slot basis. The techniques described herein provide for protection of data that may be designated as critical within a system. In other words, the techniques described herein may be performed as an alternative to full replication or mirroring of data in cache slots. Rather than always replicate all data stored in a cache, only certain designated types of data are replicated. Using the techniques described herein for caching in which only designated portions of data stored in the cache are replicated provides for better utilization of cache memory (such as global memory). In connection with techniques described in following paragraphs for performing I/O operations, for example, data that is written to cache is replicated and metadata is replicated. Additionally, as will be described in more detail in following paragraphs, data replication is performed by selecting cache slots for replication purposes in accordance with a particular memory boards in order to provide for data protection of a cache location and its replication in the event of a system failure. For example, if a first cache slot is associated with a first memory board and a copy of the first cache slot is made at a second location associated with a second memory board, in the event that the first memory board fails, data in the first cache slot is lost. However, data stored in the second cache slot may still be available if only the first memory board fails. The techniques described in following paragraphs using such memory board designations for replication of a cache slot provide for protection of cache data in the event of a system failure of cache memory.

An embodiment may also include an option providing additional flexibility for cache protection specified on a per device level. As described elsewhere herein, the caching techniques may be enabled or disabled on a per device level as specified in device configuration information stored in the device configuration table 150 of FIG. 4 described elsewhere herein.

In connection with the techniques described herein, only certain portions of data are designated as critical requiring replication. In one embodiment, data that is replicated includes metadata, and data associated with a write I/O operation as may be issued from a host connected to a data storage system. Data that is associated with a read I/O operation is not replicated unless that data is included in the critical data such as, for example, reading data that is currently replicated in cache because the data has been written to cache in connection with a previous write I/O operation. This is described in more detail in following paragraphs. In this embodiment as described herein, data which is to be written to a device in connection with a write I/O operation is first written to cache and at a point later in time written out to the actual device in accordance with a write back caching technique. Using the write back caching technique, data which is stored in the cache is the most recent or current copy of data until it is actually written out to the device. Thus, such cache data may be designated as critical data since the cache includes the most recent copy of the data. In the event that a cache failure occurs, and the data has not yet been written out to a device, the cache data may be lost. Accordingly, such data may be replicated in order to minimize data losses in the event of a cache failure, for example, as may be associated with a memory board failure. Additionally, data that may be characterized as metadata describing the actual user data is also deemed to be critical. Metadata may be used, for example, to indicate whether data is in cache or not, whether data stored on a particular disk or device is valid, and the like. Such metadata may be designated as critical and may therefore be replicated. An embodiment may designate other data portions as critical than as described herein.

Figure 9:
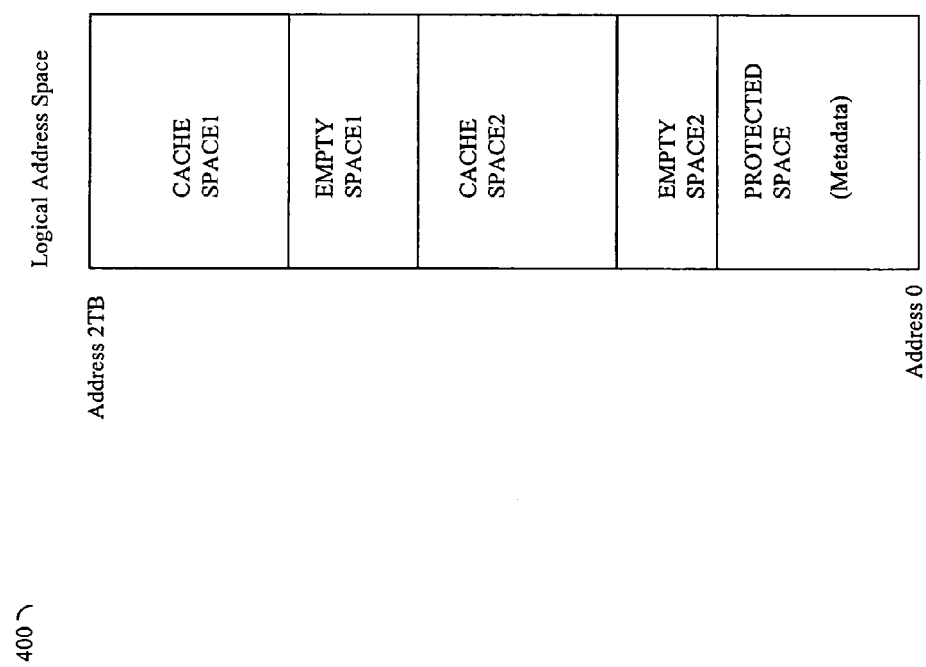

Referring now to FIG. 9, shown is an example representation 400 of the logical address space mapping that may be included in an embodiment of a data storage system described herein. The example 400 represents a layout of the available global memory for a two terabyte (TB) logical address space. The representation 400 of FIG. 9 includes a protected space (such as including the metadata), cache space 1, cache space 2, empty space 1 and empty space 2. The logical address space corresponding to the protected space is always mirrored and mapped to 2 different physical memory boards. The logical address space corresponding to each of the cache spaces 1 and 2 is not mirrored and mapped to a single physical memory board. In this particular example, cache space 1 and cache space 2 may represent those particular portions of the global memory that may be used for caching user data on disks associated with read and write I/O operations. Empty space 1 and empty space 2 are currently not mapped to any physical memory boards.

It should be noted that the representation 400 may represent the start or initial configuration of the global memory upon completion of initialization of a data storage system. In this example, the protected space includes metadata, for example, that is always replicated. An embodiment may have other types of data that may qualify to be stored in the protected space of global memory. Any writes to the protected space of global memory is written to both of these memory boards. Any reads from the protected space of the logical address space may be read from either memory board. Since both the cache spaces 1 and 2 are each mapped to one physical memory board, a write to either of these cache spaces is written to only one memory board. To provide protection to data written to the cache space requires two writes to two different physical memory boards in the system. Accordingly, cache space 1, as will be described in more detail in following paragraphs maps to a first physical memory board and cache space 2 maps to a different separate physical memory board within the system. The empty space designated as empty space 1 and empty space 2 are not logically mapped to any physical memory boards. This empty space may be used, for example, in performing online upgrades or reconfiguration when increasing the protected space, adding new physical memory to a running system, and the like.

Referring now to FIG. 10, shown is a table 450 representing the table mapping of the logical to physical addresses corresponding to the representation 400 of FIG. 9 using two separate memory boards. The table 450 may correspond, for example, to a state of global memory after initialization of a data storage system to correspond to the representation 400 of FIG. 9. The table 450 in this example includes a type field 460, a logical address field 470, a physical 1 field 480 and physical 2 field 490. The type field 460 indicates a particular type of space as previously designated and associated with the representation 400 of FIG. 9. As described above, the protected data type is mapped to two physical memory boards as indicated in columns 480 and 490. Each of the different cache spaces as indicated in column 460 is mapped to only one physical memory board. In this example, the cache space 1 is mapped to a first physical memory board and the cache space 2 is mapped to a second different physical memory board.

Figure 11:
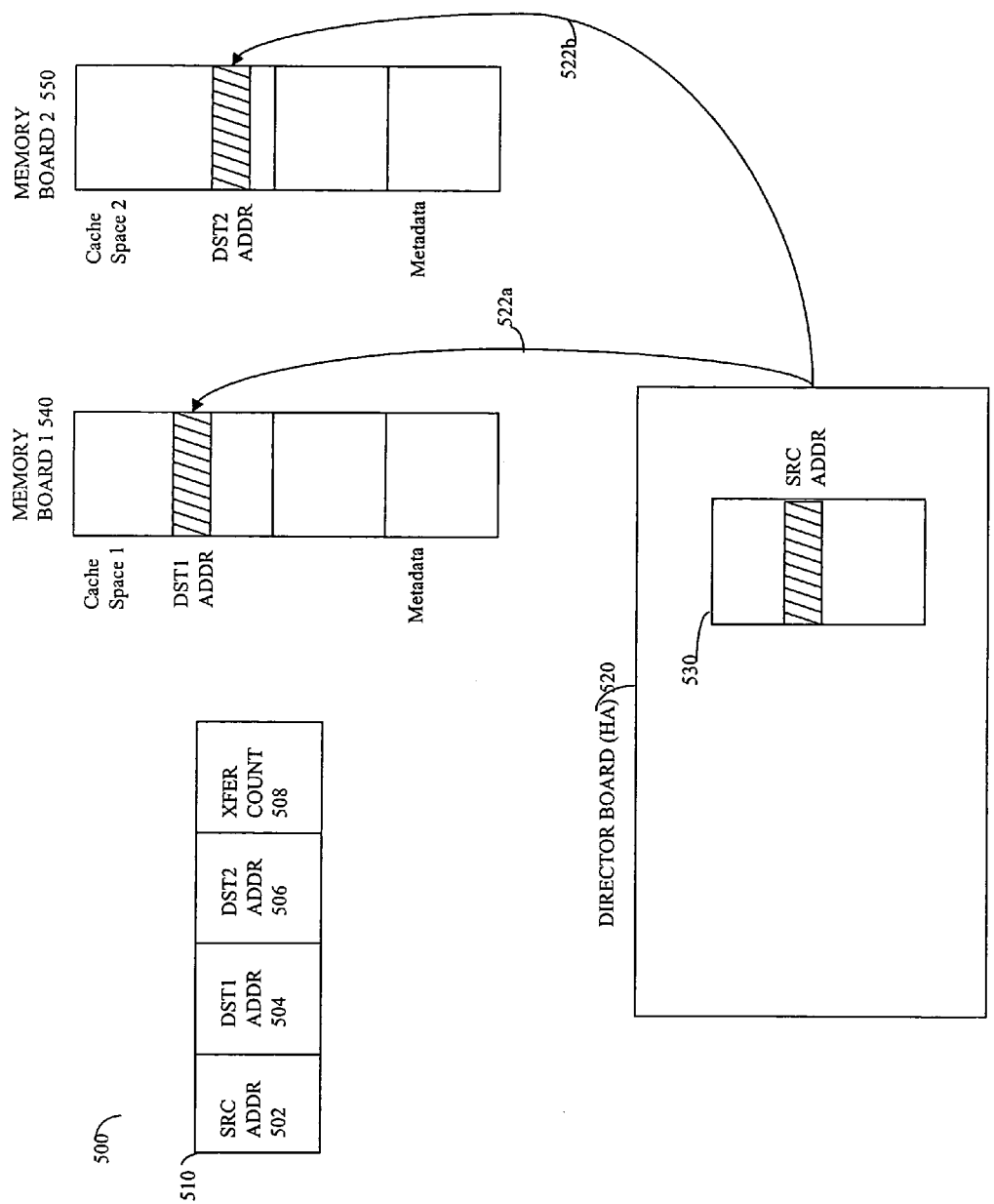
FIG. 11 is an example of an illustration of the selective memory replication technique for a write operation.

Referring now to FIG. 11, shown is a representation 500 of a descriptor 510 and an illustration of how the descriptor may be used with the different components of a data storage system. The descriptor 510 groups the different portions of data that may be associated with each particular I/O operation in connection with the memory replication technique described herein. It should be noted that the illustration 500 and accompanying description herein is made with respect to a write operation. However, it will be apparent to one of ordinary skill in the art that for a read operation, the source and the destinations with respect to the particular I/O operation are reversed. With reference to element 510, the source address (SRC ADDR) 502 indicates an address of the data to be written to a device. In the event that the I/O operation is a read, the field 502 indicates a location as to where the data which is read from a device is stored. In one embodiment, the address included in 502 may identify a location from global memory or a portion of memory that is stored locally on the particular director performing the I/O operation. The two destination fields 504 and 506 with respect to a write operation represent the first and second respective cache slots or locations on two different memory boards. Additionally, a field 508 may indicate the transfer count of a number of bytes to be transferred from the source to the destination addresses specified by fields 504 and 506.

Also included in FIG. 11 are components 520, 540 and 550. The component 520 represents a director board which may, for example, be an HA which communicates with a host initiating the read or write operation. Portion 530 may indicate a local control store or memory on the director board 520. The location of SRC ADDR 502 corresponds to a location within 530 where the data source for a write operation is stored. FIG. 11 further illustrates the transfer of data from the director 520 to the cache locations by the arrow 522a from component 520 to the components 540 (DST1 ADDR 504), and by arrow 522b from component 520 to component 550 (DST2 ADDR 506). The two destination addresses on memory boards 540 and 550 correspond to the destination addresses designated, respectively, in the fields 504 and 506 to which the source data is transferred for a write operation. The transference of data from the source to the destinations in this embodiment may be treated as two independent transfers. In other words, the memory transfers for both destinations may be performed independent of one another such that, for example, the failure of one of the transfers will not have an affect on the other data transfer to a second different destination. It should be noted that in this example, the two data transfers or writes to the two different cache portions may be performed in parallel which may or may not be done physically in parallel by the underlying hardware.

With reference to FIG. 11, the different portions of the cache allocated for use as the destination addresses for fields 504 and 506 for the write operation and other operations may be allocated dynamically when an operation is performed. The techniques described herein provide for replication and use of cache memory which adapts to the particular I/O operations being performed at a particular time. If I/O operations are, for example, mostly write operations, the cache memory is associated with caching an initial set of cache slots and replicated cache slots associated with the data being written. In the event, for example, only read operations are performed, all of the cache memory may be utilized with only a single level of caching other than the metadata which is replicated. Accordingly, the use of the cache memory is flexible and adapts to the particular I/O operations performed at a particular point in time.

It should be noted that, as will be apparent to one of ordinary skill in the art with reference to FIG. 11 for the data structures and components of 500 for a read operation, field 502 is used to designate the destination, and fields 504 and/or 506 may designate the data source for a read. For a read operation, in the event that a read is performed using data from a protected cache slot (as may be indicated using the protected bit setting described elsewhere herein), data may be read from either one of the memory boards and associated locations thereon. In the event that data which is the subject of a read operation is not protected such that the data is not replicated in more than one cache slot and more than one memory board, the data may be read from the single cache slot.

What will now be described are processing steps that may be performed in an embodiment in connection with the dynamic mapping and protection of cache slots as described herein.

Figure 12:
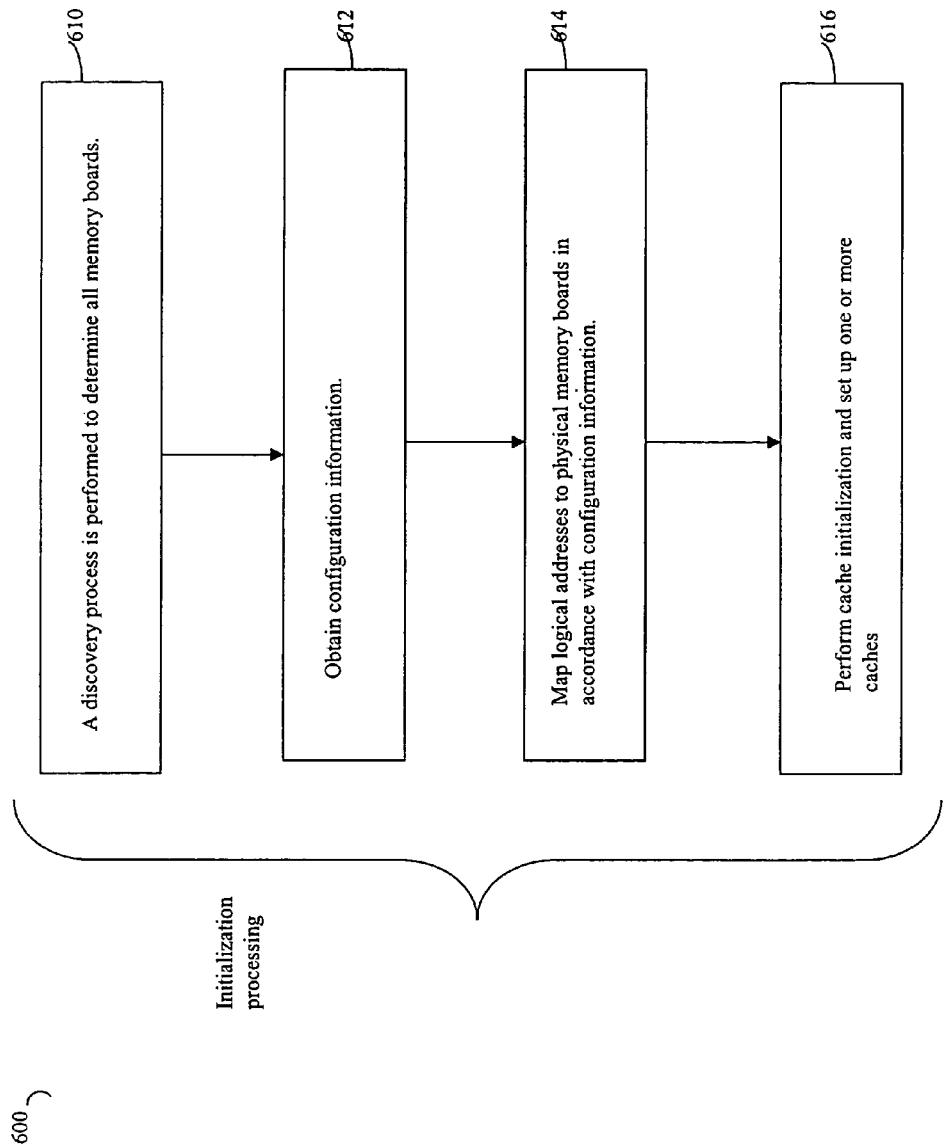
FIG. 12 is a flowchart of processing steps of one embodiment that may be performed as part of initialization processing.

Referring now to FIG. 12, shown is a flowchart 600 of processing steps that may be performed as part of a data storage system initialization processing to implement the dynamic mapping and replication of cache slots as described herein. The initialization processing steps of flowchart 600 of FIG. 12 may be performed, for example, during the initialization of a data storage system. At step 610, a discovery process may be performed to determine and recognize all of the different hardware components available on a data storage system. This may include, for example, determining and recognizing all of the different memory boards that might be addressable within a data storage system. Accordingly, all recognized memory boards may be used in connection with performing the mapping of logical address space to physical memory boards as described elsewhere herein. At step 612, configuration information may be obtained. The configuration information obtained at step 612 may include, for example, the device configuration information of table 150. The configuration information may also include mapping information for managing the global memory logical address space and caching. This may include, for example, information associated with mappings of FIGS. 9 and 10. Once this particular configuration information is obtained at step 612, the logical address to physical memory board mapping may be performed in accordance with the configuration information. Code may be executed within the data storage system to actually perform the mapping of the logical addresses to physical memory boards. At step 616, cache pointers and other data structures may be initialized. Step 616 may include, for example, establishing the pointers associated with the one or more cache structures such as the representation 160 of FIG. 5. In one embodiment, a data storage system may include one or more different separate cache structures for use.

Referring back to FIG. 8, the portion 304C includes a protected bit which may be set to one (1) when the particular cache slot is designated as being associated with a protected portion of data having a replicated cache slot associated with another memory board. Otherwise, the protected bit may be set to zero indicating that this particular cache slot is unprotected and otherwise is not replicated at another cache slot associated with a second different memory board. In accordance with the use of the protected bit, when a protected bit of a cache slot is set to one (1), it indicates that there is a second replicated cache slot on another memory board containing the same user data and portion 302b.

With reference to FIG. 7, the table 180 may indicate the one or more cache slots associated with a particular device or track. Additionally, information from the header portions of the cache slots, such as the different flags 304c, may be stored within the table 180 such as, for example, the protected bit value. Thus, by looking at the contents of table 180 for a particular track, it may be determined whether there are one or more cache slots of data currently allocated for use associated with a particular track.

Figure 13:
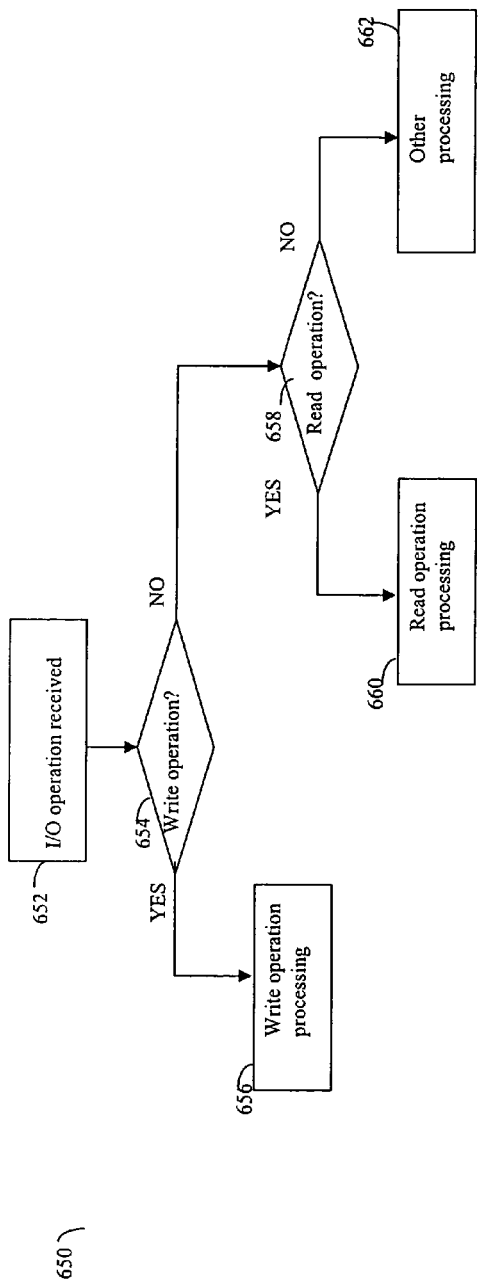
FIGS. 13-15 are flowcharts of processing steps that may be performed in connection with processing an I/O operation in a data storage system using the replication techniques described herein.

Referring now to FIG. 13, shown is a flowchart 650 of general processing steps that may be performed by a data storage system when processing an I/O operation. At step 652, an I/O operation is received. Control proceeds to step 654 to determine if this operation is a write operation. If so, control proceeds to step 656 to perform write operation processing. It should be noted that more detailed processing steps associated with a write operation are described in following paragraphs. If at step 654 it is determined that the I/O operation received is not a write operation, control proceeds to step 658 where a determination is made as to whether the I/O operation received is a read operation. If not, control proceeds to step 662 to perform other processing. Otherwise, control proceeds to step 660 to perform read operation processing which is described in more detail in following paragraphs.

Figure 14:
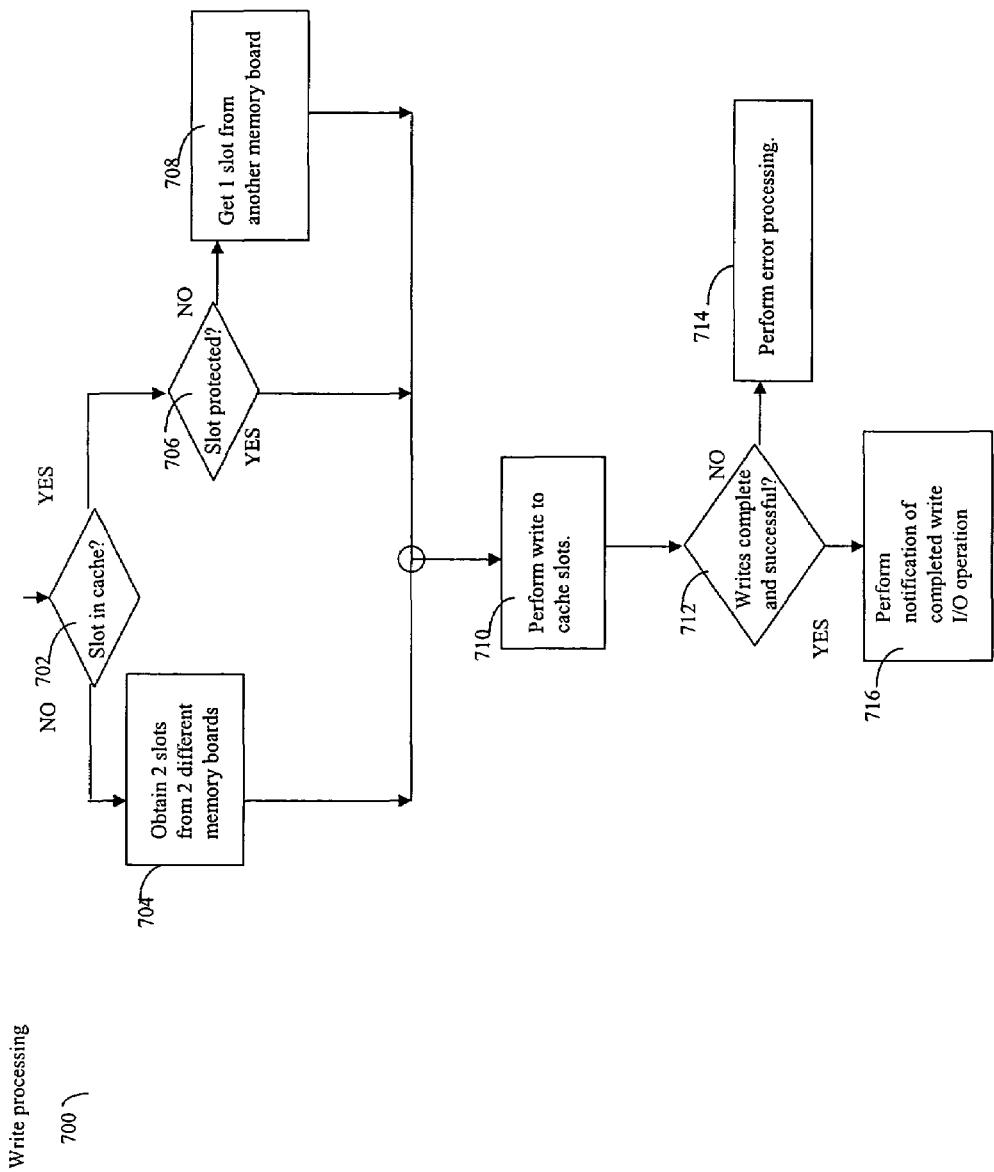

Referring now to FIG. 14, shown is a flowchart 700 of processing steps that may be performed by a data storage system when processing a write I/O operation. The steps of flowchart 700 describe in more detail those processing steps that may be associated with step 656 of flowchart 650 in FIG. 13. At step 702, a determination is made as to whether the data destination associated with the write operation has an allocated or associated slot already in cache. If not, control proceeds to step 704 to obtain two different slots from the cache from two different memory boards. In one embodiment when obtaining the two different slots, any one of a variety of different techniques may be used in selecting the particular cache slots. An embodiment may, for example, give preference to a logical to physical mapping that is located on two different memory boards for each of the different slots and additionally will allow both write operations to each of the different cache slots to proceed on independent messaging fabrics in parallel. From step 704, control proceeds to step 710. If at step 702 it is determined that the data destination of the write operation is already associated with a cache slot, control proceeds to step 706 to determine if the cache slot is protected. If so, control proceeds to step 710 since, if the protected bit is set, it indicates that there is already a replicated copy of the cache slot. Otherwise, if step 706 determines that the current cache slot is not indicated as protected by the protected bit setting, control proceeds to step 708 to obtain an additional cache slot from another different memory board. If the cache slot determined at step 702 does not have a protected bit set, it indicates that there is only one copy of the cache slot currently in memory. Accordingly, an additional cache slot is obtained at step 708 to which the write operation data is replicated. Control then proceeds from step 708 to step 710.

At step 710, the data which is the source of the write operation is written to the two cache slots. At step 712, a determination is made as to whether the writes have completed to the cache slots successfully. If not, control proceeds to step 714 to perform error processing. If the writes have completed successfully at step 712, control proceeds to step 716 to perform notification of a completed write I/O operation. Such notification may be sent, for example, from the data storage system to the host. In connection with performing the write operations at step 710, each of the writes may be performed using a direct memory access. Once the transfers have completed, notification may first be sent to the director, such as the HA which requested the write to be performed at 710. Subsequently, the director or HA may notify the host or other component of the status of the I/O operation.

In connection with performing a write operation, any existing slots currently allocated for use associated with the destination of the write operation have their data segments overwritten with the new data specified by the write operation. Accordingly, when a cache slot is written or updated with new data, one or more bits may be set in a particular cache slot. For example, the WP or write pending bit may be set, the dirty bit may be set in the event that there is a difference between the data included in the cache and that which is actually stored on a device, and the like. Additionally, each time a new slot is obtained for use, information may be stored in the cache slot associating it with a particular track, indicating whether the particular slot is protected, and accordingly setting other bits and data fields for the particular operation being performed.

It should also be noted that when a new slot is needed, for example, at step 708, any one of a variety of different techniques may be used to obtain the cache slot. In one embodiment, a cache slot may be obtained from an unused or available free cache slot designation pool. In the event that there are no available cache slots and one is needed, for example, in performing processing at step 708, any one of a variety of different techniques may be used to obtain a slot which may result in displacement of cached data from an existing cache slot. When displacing data from a cache slot for reuse, an embodiment may perform processing steps for cache management in accordance with the particular cache management techniques used in an embodiment. For example, when displacing data from a cache for reuse, the data may first be written out to the actual device prior to being re-used for other user data. Whether data needs to be written out to the actual device may depend on particular settings within the cache slot such as, for example, whether the write pending bit is set and whether the cache slot contains a more recent version of the data than that which is actually stored on the device.

Figure 15:
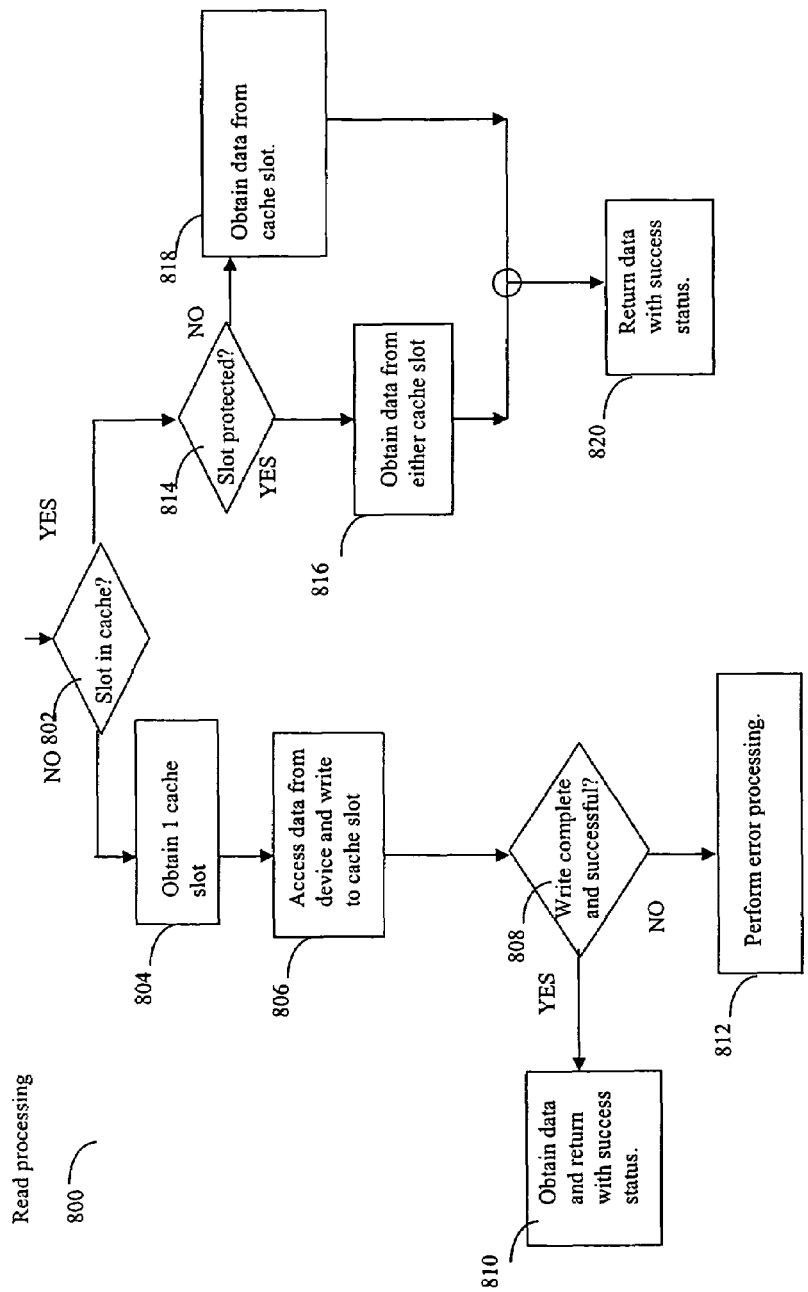

Referring now to FIG. 15, shown is a flowchart 800 of processing steps that may be performed in an embodiment when processing a read operation. The flowchart 800 of FIG. 15 is one embodiment of more detailed processing of step 660 of flowchart 650 in FIG. 13. At step 802, a determination is made as to whether there is a cache slot in memory associated with the address of the read operation. If it is determined at step 802 that there is currently no cache slot associated with data for the read operation, control proceeds to step 804 where a cache slot is obtained. At step 806, data is read from the device and written to the cache slot. As described elsewhere herein in this embodiment, data which is the subject of a read operation is first read from the device into cache, and then subsequently provided to the requester. At step 808, a determination is made as to whether the write to the cache slot has been successful. If not, control proceeds to step 812 to perform error processing. Otherwise, if the write to the cache slot has been successful, control proceeds from step 808 to 810 where the data is returned with a success status for the read operation.

If at step 802 it is determined that there is a cache slot associated with the data for the read operation, control proceeds to step 814 where a determination is made as to whether that cache slot includes protected data as may be indicated, for example, by the protected bit of a cache slot. If so, control proceeds to step 816 where the data may be obtained from either of the two cache slots in accordance with any one of a variety of different techniques included in an embodiment. In one embodiment, for example, a load balancing technique as known to those of ordinary skill in the art (such as, for example, round robin) may be used in connection with selecting which of the two slots to read the data from in step 816. Control then proceeds to step 820 where the data is returned with a success status for the read operation. If at step 814 it is determined that the slot is not protected indicating that there is only a single copy of data in the cache, control proceeds to step 818 where the data is obtained from that single cache slot and control proceeds to step 820.

It should be noted that in connection with the cache management techniques described herein, if a cache slot is designated as free or available for use and is a protected cache slot, its corresponding replicated cache slot may also be freed. In other words, protected cache slots may be allocated and released in an embodiment in pairs. Additionally, the cache management processing is also responsible for updating and synchronizing both of the cache slots. It is the responsibility of the cache management processing to maintain data coherency between replicated cache slots as described herein. The particular information that needs to be synchronized in an embodiment may vary in accordance with the particular information included in each of the cache slots and how a particular embodiment implements the techniques described herein.

Use of the techniques described herein for selective memory replication may be useful in connection with a hardware component failure condition of a memory board used to store cached data where user data integrity needs to be maintained and data availability needs to be guaranteed. If, for example, the writing of data to a cache slot as may be performed by an HA or director fails, a determination may be made that there are one or more failed memory boards. What will now be described are processing steps that may be performed in an embodiment in connection with recovery from this condition for critical data that is protected and selectively replicated.

Figure 16:
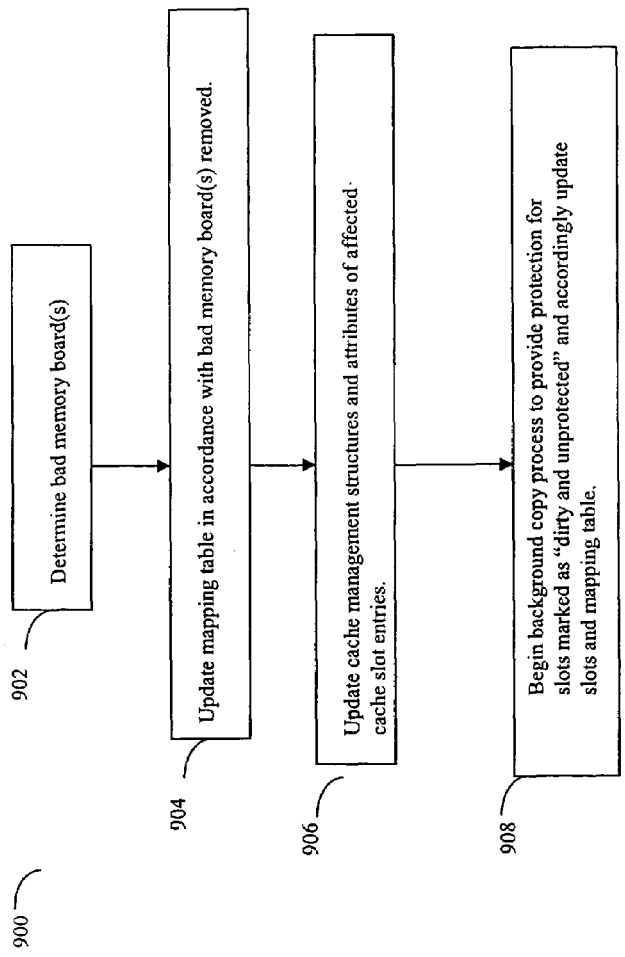
FIG. 16 is a flowchart of processing steps of one embodiment for performing recovery processing using the replication techniques described herein.

Referring now to FIG. 16, shown is a flowchart 900 of processing steps that may be performed in connection with a memory failure and an error recovery technique using the selective replication techniques described herein for critical data. At step 902, a determination is made that one or more memory boards are bad. As described elsewhere herein, one or memory boards may be designated as bad in connection with a failed direct memory access (DMA) when trying to update a portion of a cache. In one embodiment, a memory board may be determined as failed after repeatedly trying to update one or more cache slots. At step 904, the mapping table or tables, for example as described elsewhere herein in connection with FIGS. 9 and 10, may be updated such that the bad memory board may be removed. This may result in modifying one or more data structures stored internally within the data storage system such as, for example, to indicate that a failed memory board corresponding to cache space 2 is now an empty space. Control proceeds to step 906 where one or more cache management structures and the attributes of the affected cache slot entries are updated. This may include modifying table 180 of FIG. 7 as well as one or more entries and associated cache slot bits such as the flags in portions 304c of affected cache slots. In one embodiment, the following cache slot attributes or flags may be updated:

| Original Attribute Settings | New Attribute Settings |
|---|---|
| Protected and dirty | Unprotected and dirty |
| Protected and not dirty | Unprotected and not dirty |
| Unprotected | Not in cache |
| Not in cache | Not in cache |

Control may proceed to step 908 where a background copy process may begin to perform recovery processing and provide protection for the slots marked as dirty and unprotected. The background copy process may copy the unprotected dirty slots to another physical memory board assuming that there are additional functional memory boards remaining in the system. Once the dirty slot has been duplicated on a separate memory board, the attribute of a cache slot may then be reset to indicate that it is now protected again.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for caching data comprising:
    receiving data;
    determining whether to replicate the data in a cache in accordance with one or more designated types of data, said one or more designated types of data including data that is associated with a write operation, wherein the cache includes at least a first memory board and a second memory board different from said first memory board, wherein a logical address space is defined spanning a range of logical addresses from a first logical address to an ending logical address, said logical address space comprising mutually exclusive address range portions including a first logical address range portion and a second logical address range portion;
    if said determining determines that the data is to be replicated and the data is associated with a write operation, selecting a first cache location from a first set of cache locations on the first memory board associated with said first logical address range portion and selecting a second cache location from a second set of cache locations on the second memory board associated with said second logical address range portion in accordance with a mapping table indicating portions of the first and the second memory boards including the first and the second cache locations, and storing the data in the first cache location and the second cache location; and
    if said determining determines that the data is not to be replicated, selecting a single cache location from the first set of cache locations associated with said first logical address range portion or from the second set of cache locations associated with said second logical address range portion in accordance with the mapping table, and storing the data in the single cache location, wherein said single cache location is selected from a plurality of cache locations having a plurality of corresponding logical addresses comprising each logical address in said first logical address range portion and each logical address in said second logical address range portion, wherein said determining, said selecting the first cache location and selecting the second cache location are performed after the cache is initialized for selective data replication.

2. The method of claim 1, further comprising:
receiving a read operation at a data storage system;
determining if data of the read operation is not associated with a cache location; and
if the data of the read operation is not associated with a cache location,
obtaining the data of the read operation from a device;
selecting a cache location from said cache; and
storing the data of the read operation at the cache location.

3. The method of claim 1, wherein said determining determines that the data is not to be replicated in the cache when the data received is in connection with a read operation.

4. The method of claim 2, further comprising:
if the data of the read operation is associated with a cache location, determining if the data of the read operation is replicated in another cache location; and
if the data of the read operation is replicated, selecting one of the cache locations including the data of the read operation for obtaining the data to be returned to a requestor.

5. The method of claim 1, further comprising:
receiving a write operation at a data storage system;
determining if a target of the write operation is associated with a cache location;
if the target of the write operation is associated with a cache location, determining whether the data of the cache location for the write operation is replicated;
if the data of the cache location for the write operation is not replicated, determining another cache location and updating both cache locations to include data of the write operation request;
if the data of the write operation is replicated, updating both cache locations to include data of the write operation request; and
if the data of the write operation is not associated with a cache location, determining two cache locations for storing two copies of the data of the write operation.

6. The method of claim 1, wherein said determining whether to replicate the data examines a flag indicating whether replication for caching has been enabled for I/O operations associated with a particular device.

7. The method of claim 6, wherein said flag is included in device configuration information.

8. The method of claim 1, wherein selection of a cache location is dynamically determined in response to receiving an I/O operation request at a data storage system when said I/O operation is processed by the data storage system.

9. A computer readable medium comprising executable code stored thereon for caching data, the computer readable medium comprising executable code that:
receives data;
determines whether to replicate the data in a cache in accordance with one or more designated types of data, said one or more designated types of data including data that is associated with a write operation, wherein the cache includes at least a first memory board and a second memory board different from said first memory board, wherein a logical address space is defined spanning a range of logical addresses from a first logical address to an ending logical address, said logical address space comprising mutually exclusive address range portions including a first logical address range portion and a second logical address range portion;
if said data is to be replicated and the data is associated with a write operation, selects a first cache location from a first set of cache locations on the first memory board associated with said first logical address range portion and selects a second cache location from a second set of cache locations on the second memory board associated with said second logical address range portion in accordance with a mapping table indicating portions of the first and the second memory boards including the first and the second cache locations, and stores the data in the first cache location and the second cache location; and
if said data is not to be replicated, selects a single cache location from the first set of cache locations associated with said first logical address range portion or from the second set of cache locations associated with said second logical address range portion in accordance with the mapping table, and stores the data in the single cache location, wherein said single cache location is selected from a plurality of cache locations having a plurality of corresponding logical addresses comprising each logical address in said first logical address range portion and each logical address in said second logical address range portion, wherein said executable code that determines, said executable code that selects the first cache location and said executable code that selects the second cache location are executed after the cache is initialized for selective data replication.

10. The computer readable medium of claim 9, further comprising executable code that:
receives a read operation at a data storage system;
determines if data of the read operation is not associated with a cache location; and
if the data of the read operation is not associated with a cache location,
obtains the data of the read operation from a device;
selects a cache location from said cache; and
stores the data of the read operation at the cache location.

11. The computer readable medium of claim 9, wherein executable code that determines that the data is not to be replicated when the data received is in connection with a read operation.

12. The computer readable medium of claim 10, further comprising executable code that:
if the data of the read operation is associated with a cache location, determines if the data of the read operation is replicated in another cache location; and
if the data of the read operation is replicated, selects one of the cache locations including the data of the read operation for obtaining the data to be returned to a requester.

13. The computer readable medium of claim 9, further comprising executable code that:
receives a write operation at a data storage system;
determines if a target of the write operation is associated with a cache location;
if the target of the write operation is associated with a cache location, determines whether the data of the cache location for the write operation is replicated;
if the data of the cache location for the write operation is not replicated, determines another cache location and updating both cache locations to include data of the write operation request;
if the data of the write operation is replicated, updates both cache locations to include data of the write operation request; and
if the data of the write operation is not associated with a cache location, determines two cache locations for storing two copies of the data of the write operation.

14. The computer readable medium of claim 9, wherein said executable code that determines whether to replicate the data examines a flag indicating whether replication for caching has been enabled for I/O operations associated with a particular device.

15. The computer readable medium of claim 14, wherein said flag is included in device configuration information.

16. The computer readable medium of claim 9, wherein selection of a cache location is dynamically determined in response to receiving an I/O operation request at a data storage system when said I/O operation is processed by the data storage system.

17. A data storage system comprising:
   a cache including a first memory board and a second memory board different from said first memory board, wherein a logical address space is defined spanning a range of logical addresses from a first logical address to an ending logical address, said logical address space comprising mutually exclusive address range portions including a first logical address range portion, a second logical address range portion and a third logical address range portion;
   a computer readable memory comprising executable code stored thereon for:
      receiving data;
      determining whether to replicate the data in the cache in accordance with whether the data is critical data, said critical data including data that is metadata about other data in the data storage system or data associated with a write operation;
      if said determining determines that the data is to be replicated in the cache, selecting a first cache location on the first memory board and selecting a second cache location on the second memory board, and storing the data in the first cache location and the second cache location, wherein if said data is metadata, a single logical address included in said first logical address range portion is mapped to said first cache location and said second cache location, and if said data is associated with a write operation, said first cache location is associated with said second logical address range portion and said second cache location is associated with said third logical address range portion; and
      if said determining determines that the data is not to be replicated in the cache, selecting a single cache location of the cache associated with one of said second logical address range portion or said third logical address range portion, and storing the data in the single cache location.

18. The data storage system of claim 17, wherein the data storage system uses a write back caching technique.

19. The data storage system of claim 17, wherein a cache location of the cache includes a flag which is set in accordance with whether the data in the cache location is replicated in another cache location of the cache.

* * * * *